(12) United States Patent
Caron et al.

(10) Patent No.: US 12,017,157 B2
(45) Date of Patent: Jun. 25, 2024

(54) DEAERATOR FOR AIRCRAFT ENGINE AND ASSOCIATED METHOD OF OPERATION

(71) Applicant: PRATT & WHITNEY CANADA CORP., Longueuil (CA)

(72) Inventors: Jean-Francois Caron, Drummondville (CA); Ivan Sidorovich Paradiso, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 497 days.

(21) Appl. No.: 17/155,895

(22) Filed: Jan. 22, 2021

(65) Prior Publication Data

US 2022/0233973 A1 Jul. 28, 2022

(51) Int. Cl.
*B01D 19/00* (2006.01)
*F01D 25/20* (2006.01)
*F02C 7/06* (2006.01)

(52) U.S. Cl.
CPC ......... *B01D 19/0057* (2013.01); *F01D 25/20* (2013.01); *F02C 7/06* (2013.01)

(58) Field of Classification Search
CPC ........ B01D 19/0057; F01D 25/20; F02C 7/06
See application file for complete search history.

(56) References Cited

U.S. PATENT DOCUMENTS

| | | | |
|---|---|---|---|
| 2,034,914 A | 3/1936 | Lanser | |
| 2,725,956 A * | 12/1955 | Cunningham | F16K 24/04 137/81.1 |
| 8,231,714 B2 | 7/2012 | Cornet et al. | |
| 9,714,561 B2 | 7/2017 | Hopper | |
| 9,976,490 B2 | 5/2018 | Sheridan | |
| 10,729,992 B2 | 8/2020 | Pulter et al. | |
| 11,253,804 B2 | 2/2022 | Scaife | |
| 2006/0064954 A1 | 3/2006 | Yokota et al. | |
| 2021/0156515 A1* | 5/2021 | Schetzel | F02C 7/06 |
| 2021/0356077 A1 | 11/2021 | Daniel et al. | |
| 2022/0026021 A1 | 1/2022 | Martin | |

FOREIGN PATENT DOCUMENTS

| | | | |
|---|---|---|---|
| DE | 102011014750 | 9/2012 | |
| EP | 0654292 | 5/1995 | |
| EP | 1353038 | 10/2003 | |
| EP | 3315182 | 5/2018 | |
| GB | 561521 | 5/1944 | |
| SU | 638382 | 12/1978 | |
| WO | 2005028067 | 3/2005 | |
| WO | 2014150836 | 9/2014 | |
| WO | WO-2019231398 A1 * | 12/2019 | B01D 45/16 |

* cited by examiner

*Primary Examiner* — Youngsul Jeong
(74) *Attorney, Agent, or Firm* — Norton Rose Fulbright Canada LLP

(57) ABSTRACT

The de-aerator can be used to separate air from oil in an aircraft engine lubrication system. The de-aerator can include a swirler cavity extending circumferentially around axis and axially between a proximal wall and a distal wall, a separation path dividing within the swirler cavity into a radially outer oil segment leading to an oil outlet and a radially inner air segment leading to an air outlet, and a swirling conduit portion having a length turning around the axis upstream of an opening in the proximal wall along the separation path.

19 Claims, 9 Drawing Sheets

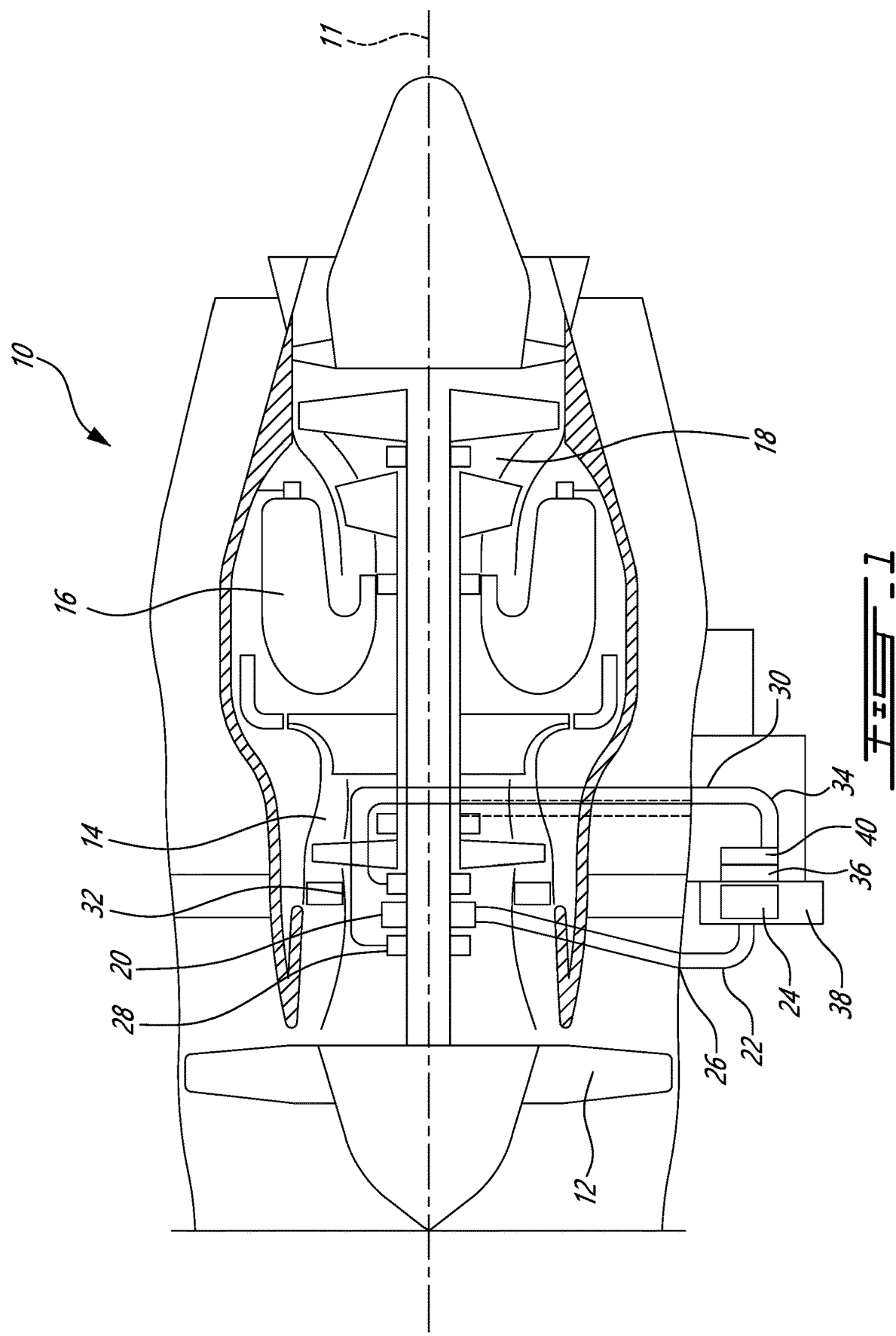

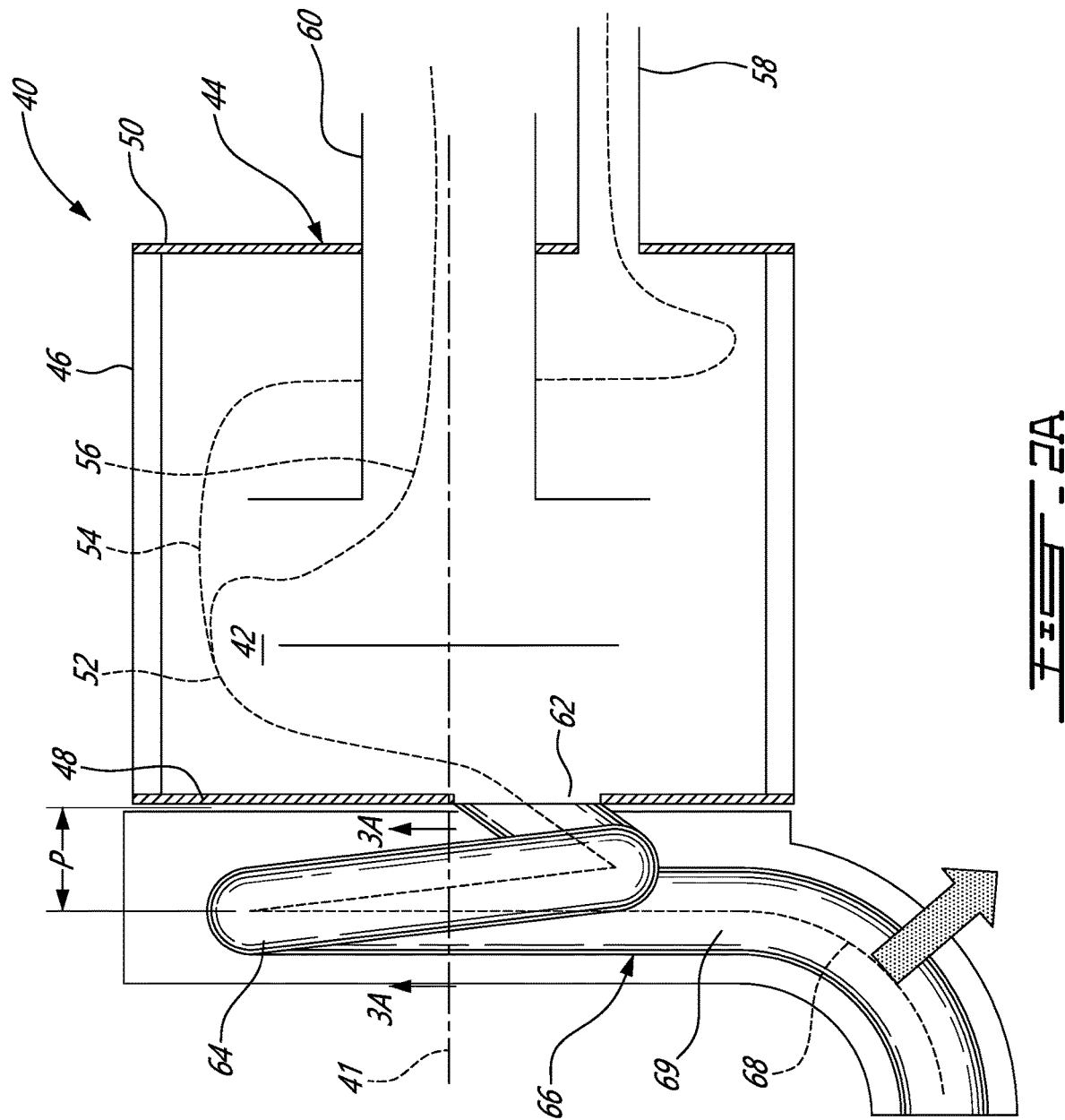

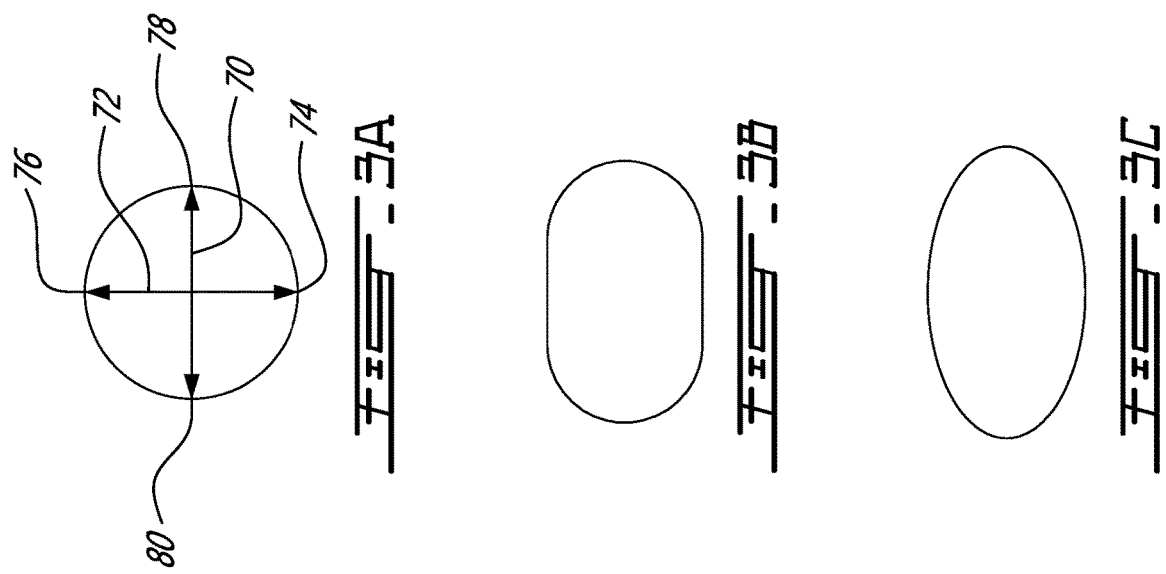
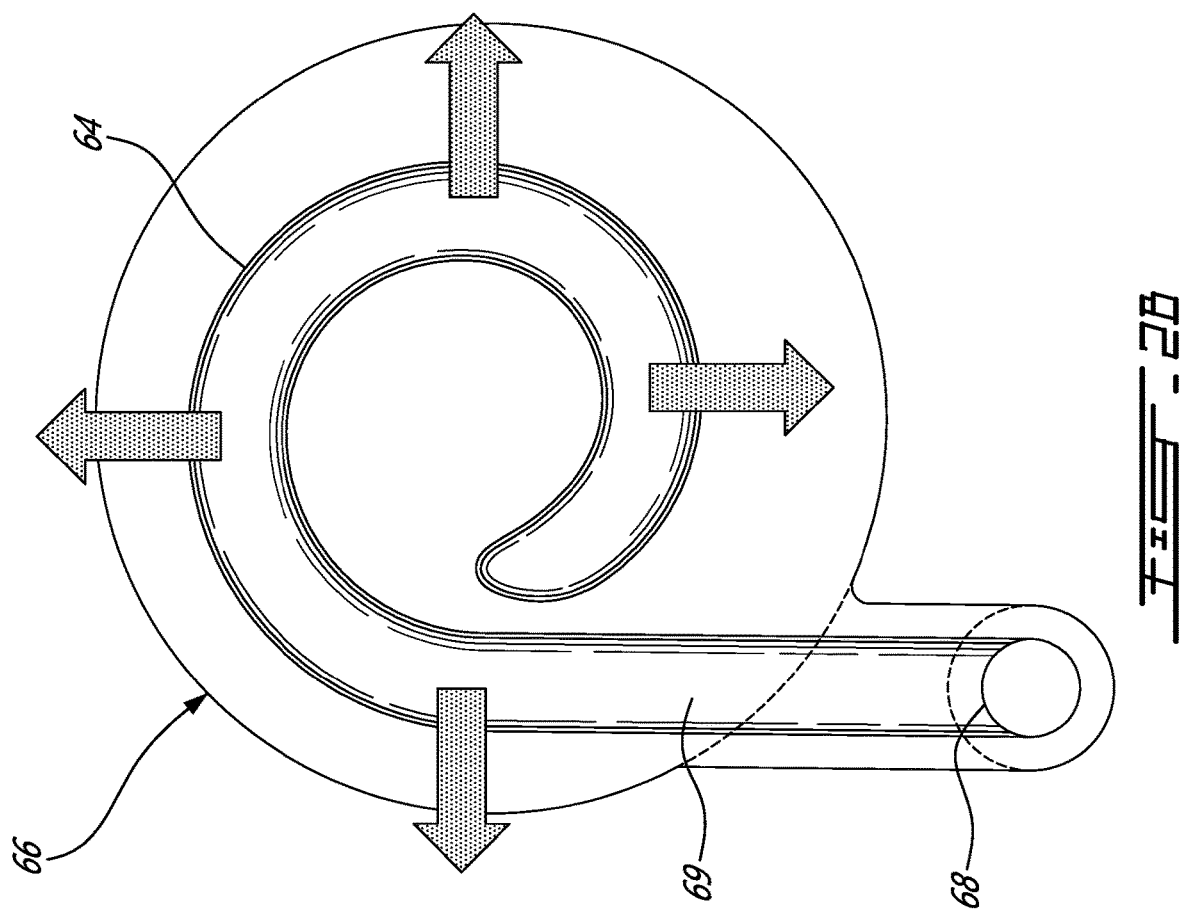

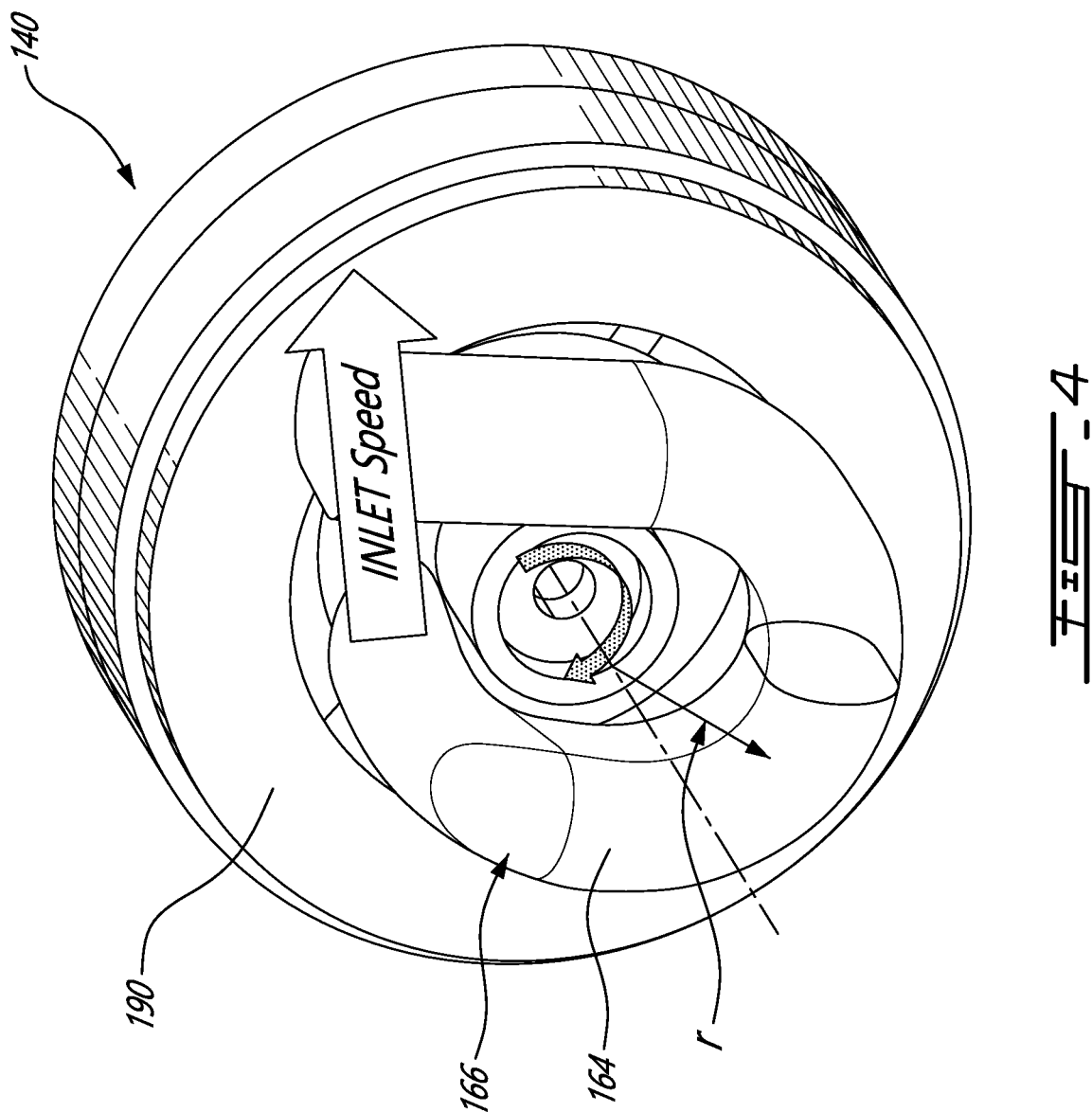

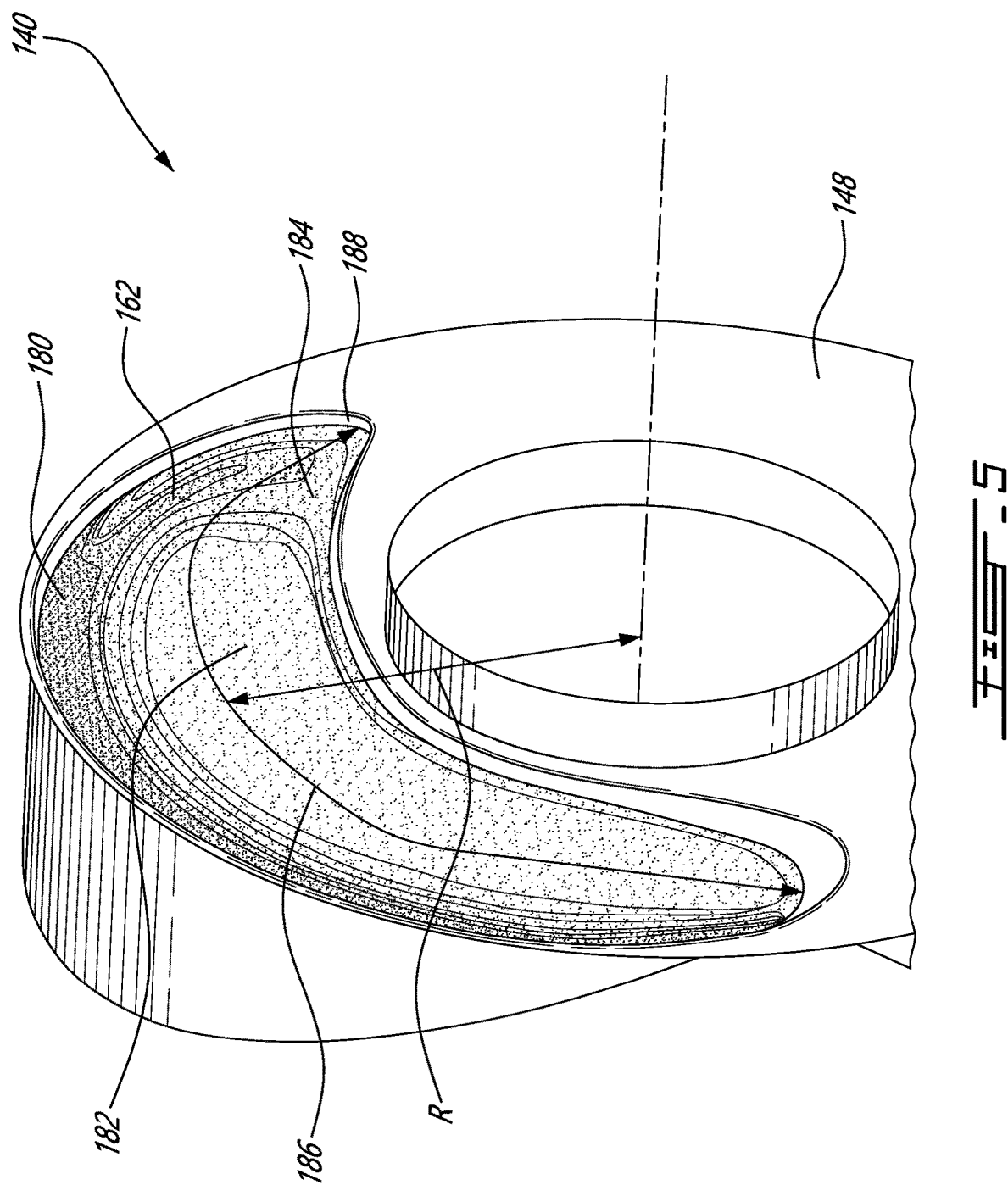

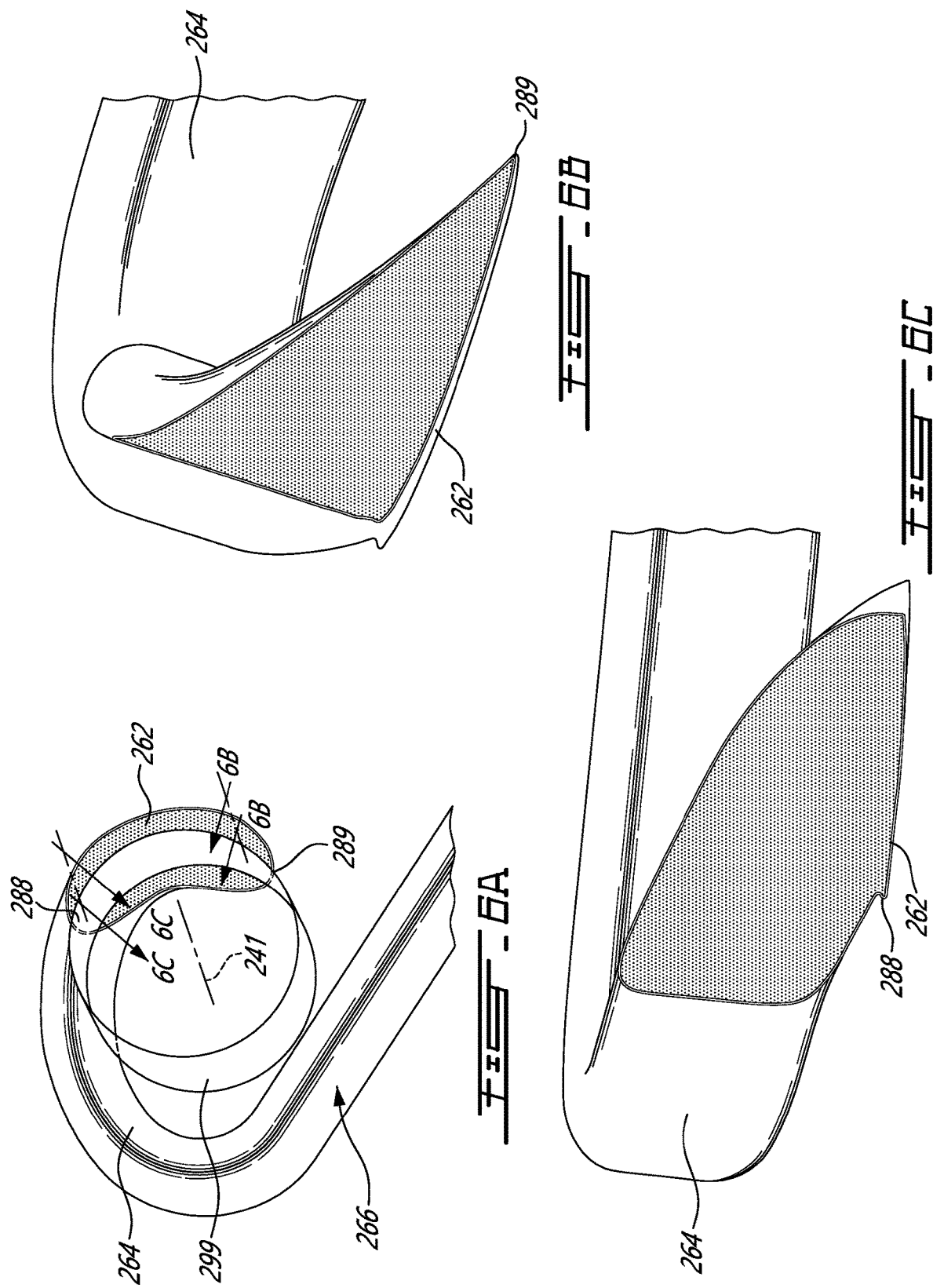

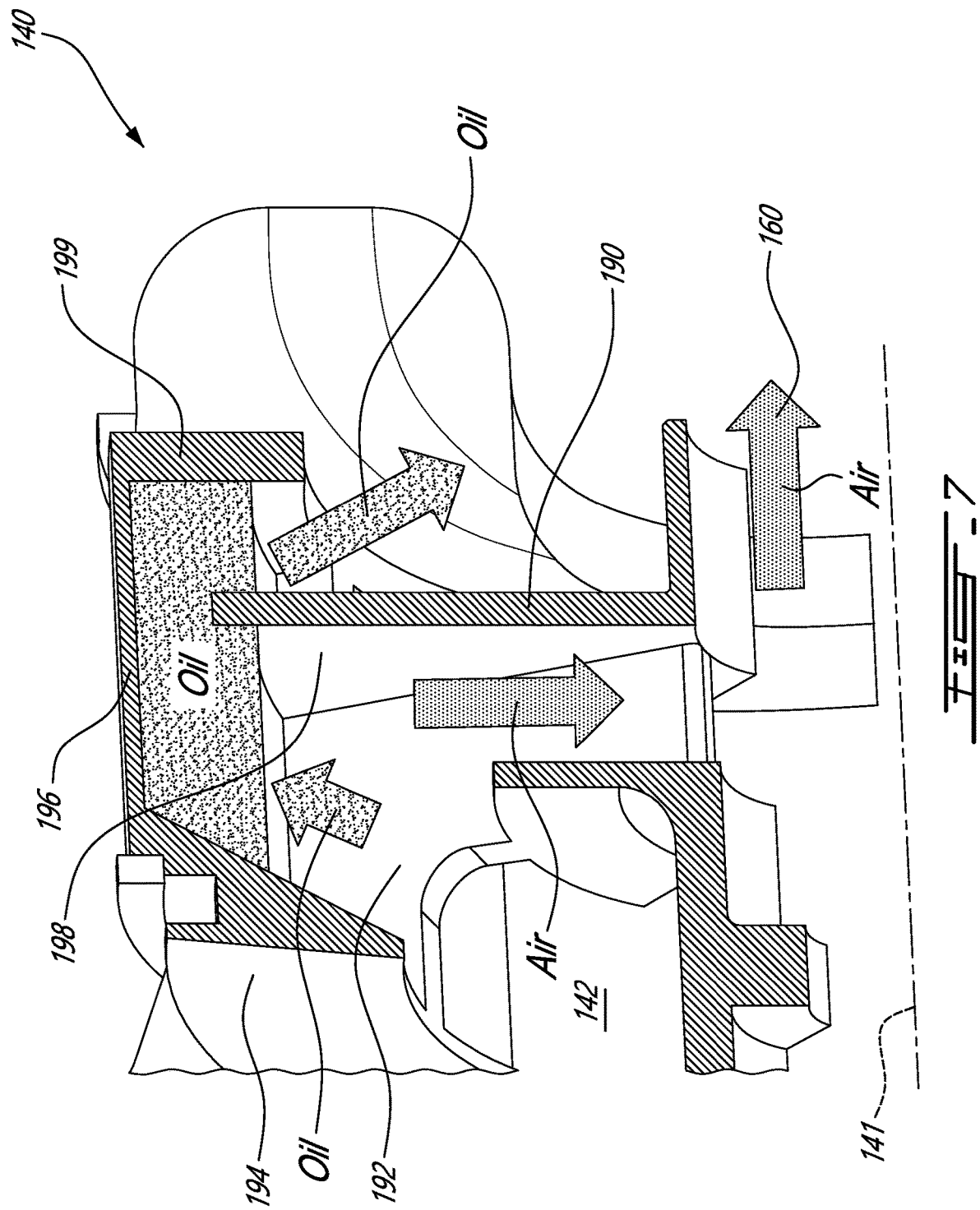

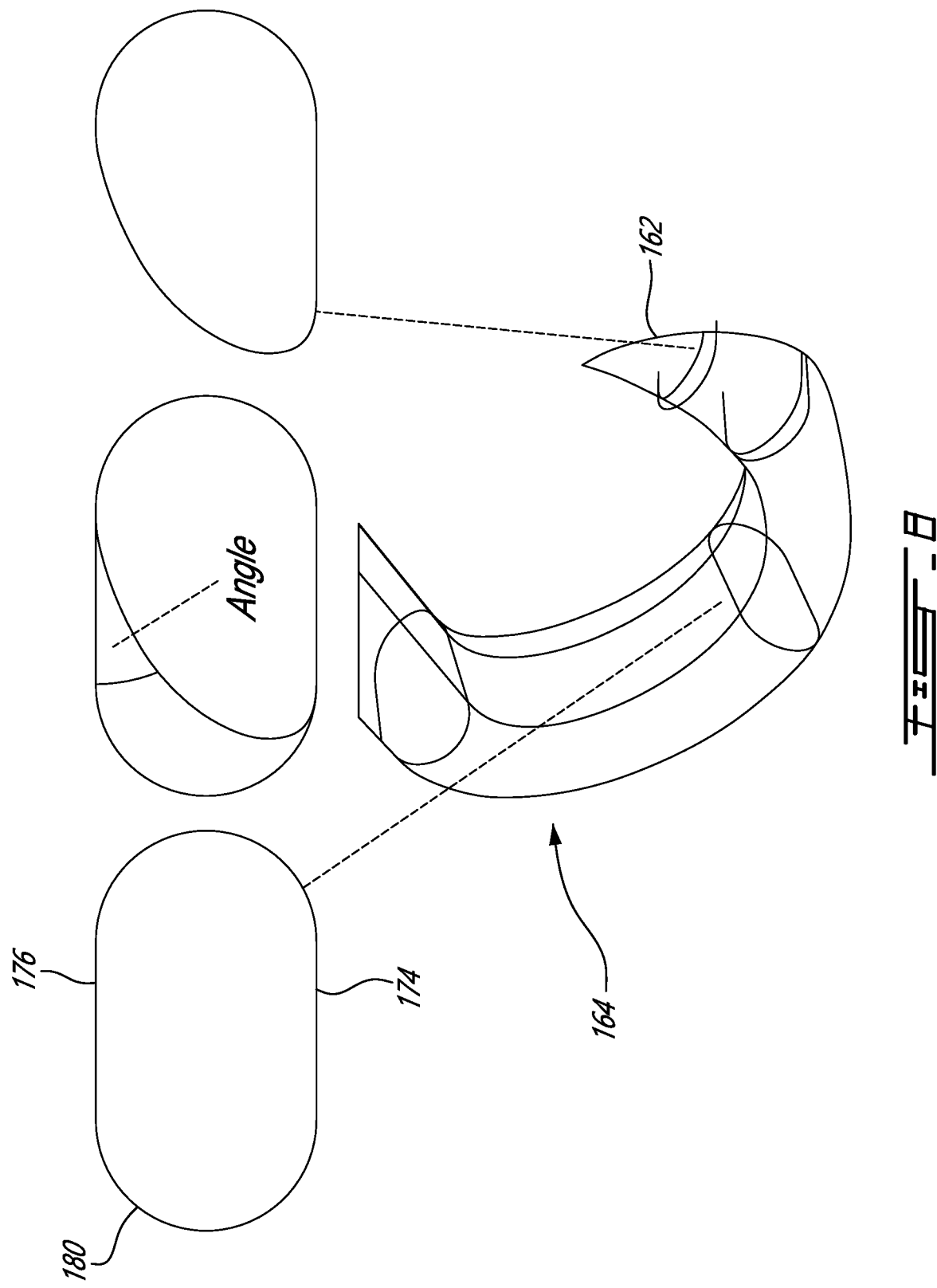

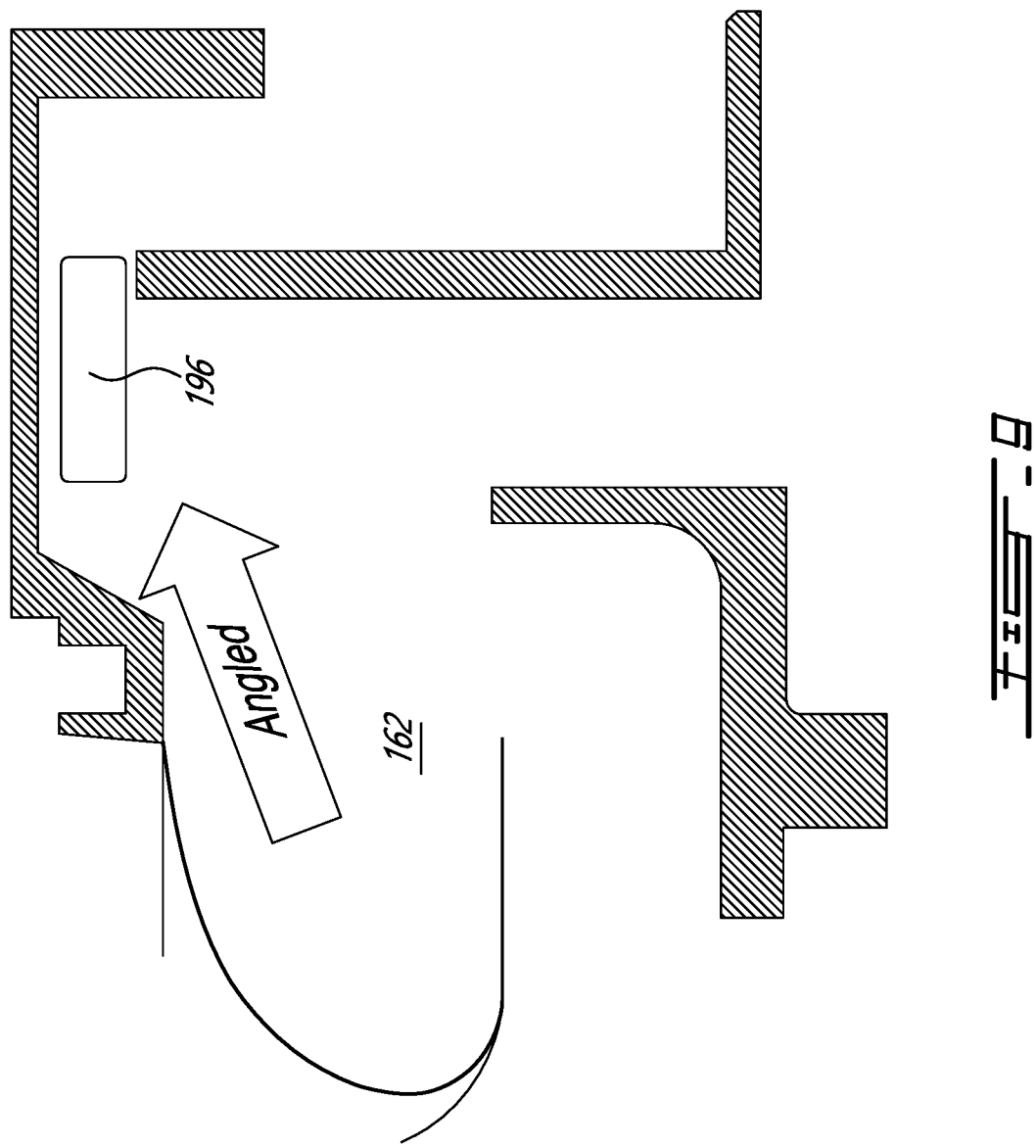

DEAERATOR FOR AIRCRAFT ENGINE AND ASSOCIATED METHOD OF OPERATION

TECHNICAL FIELD

The application relates generally to aircraft engine lubrication systems and, more particularly, to deaerators thereof.

BACKGROUND OF THE ART

Aircraft engines typically have rotating parts held within a casing by bearings. A lubricant, oil, is typically continuously circulated to the bearings to ensure their proper functionality, and scavenged from the bearing cavities for continuous re-use in a cycle. When the oil returns to the pump(s), it can be foamy and have a significant air content. In a static reservoir, the air would eventually separate from the oil over time, its lower density driving it upwardly in reaction to the denser oil's pull downward due to the action of gravity, but aircraft engines are very dynamic environments, where weight is a constant design concern, in addition to manufacturability, durability, and costs generally, and it may not be practical to base the deaerating strategy solely on the use of a static reservoir. For instance, it can be desired to limit the amount of oil carried by the aircraft. Such considerations can favor the use of a deaerator to actively separate the air from the oil using centrifugal acceleration. While existing deaerators have been satisfactory to a certain degree, there always remains room for improvement, including in optimizing them in a manner to achieve better separation efficiency, require lower maintenance, represent lower cost, achieve lower weight, etc.

SUMMARY

In one aspect, there is provided a de-aerator for an aircraft engine lubrication system, the de-aerator comprising: a swirler cavity extending circumferentially around axis and axially between a proximal wall and a distal wall, a separation path dividing within the swirler cavity into a radially outer oil segment leading to an oil outlet and a radially inner air segment leading to an air outlet, and a swirling conduit portion having a length turning around the axis upstream of an opening in the proximal wall along the separation path, the opening fluidly connecting the swirling conduit portion to the swirler cavity, the swirling conduit portion oriented both circumferentially and axially immediately upstream of the opening.

In another aspect, there is provided a method of separating air from oil in an aircraft engine lubrication system, the method comprising: performing a first separation step including conveying a mixture of said air and oil along a swirling conduit portion including turning a flow of the mixture along an axis while simultaneously advancing the flow of the mixture along the axis, said turning causing the oil to concentrate radially outwardly and said air to migrate radially inwardly; outputting the mixture of air and oil from the swirling conduit portion both circumferentially and axially into a swirler cavity, and performing a second separation step including rotating the mixture of air and oil within the swirler cavity, including directing a radially outward concentration of oil to an oil outlet and a radially inward concentration of air to an air outlet.

In a further aspect, there is provided a fluid separator for separating a higher density liquid from a lower density fluid, the separator comprising: a separation path extending sequentially across a swirling conduit portion and a swirler cavity, the swirler cavity having an axis and defined within a radially-outer wall, a proximal wall and a distal wall, the proximal wall and the distal wall extending radially inwardly at axially opposite ends of the radially-outer wall, the separation path dividing within the swirler cavity into a radially outer oil segment leading to an oil outlet and a radially inner air segment leading to an air outlet, the swirling conduit portion turning around the axis upstream of an opening in the proximal wall, the opening fluidly connecting the swirling conduit portion to the swirler cavity, the swirling conduit portion oriented both circumferentially and axially immediately upstream of the opening.

DESCRIPTION OF THE DRAWINGS

Reference is now made to the accompanying figures in which:

FIG. 1 is a schematic cross-sectional view of a gas turbine engine;

FIG. 2A is a schematic cross-sectional view of a deaerator taken along an axial/radial plane;

FIG. 2B is a proximal elevation view of the deaerator of FIG. 2A;

FIGS. 3A, 3B and 3C are corresponding examples of cross-sectional profiles for a swirling conduit portion of a deaerator;

FIG. 4 is an oblique view of portions of a deaerator in accordance with another example;

FIG. 5 is an oblique view of an opening fluidly connecting a swirling conduit portion to a swirler cavity;

FIG. 6A is an oblique view of another embodiment of a conduit of a deaerator;

FIG. 6B is a schematic view taken along lines 6B-6B of FIG. 6A;

FIG. 6C is a schematic view taken along lines 6C-6C of FIG. 6A;

FIG. 7 is a cross-sectional view of a portion of portions of the deaerator of FIG. 5;

FIG. 8 is an oblique view of a swirling conduit portion of the deaerator of FIG. 5, schematically representing a lengthwise variation in the cross-sectional profile;

FIG. 9 is a cross-sectional view of a deaerator schematizing the effect of the cross-sectional profile adjacent the opening.

DETAILED DESCRIPTION

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases.

The compressor 14, fan 12 and turbine 18 have rotating components which can be mounted on one or more shafts. Bearings 20 are used to provide smooth relative rotation between a shaft and casing (non-rotating component), and/or between two shafts which rotate at different speeds. An oil lubrication system 22 including an oil pump 24, sometimes referred to as a main pump, and a network of conduits and nozzles 26, is provided to feed the bearings 20 with oil. Seals 28 are used to delimit bearing cavities 32 and contain the oil. A scavenge system 30 having cavities 32, conduits 34, and one or more scavenge pumps 36, is used to recover the oil from the bearing cavities 32, which can be in the form of an oil foam at that stage. The oil pump 24 typically draws the oil from an oil reservoir 38, and an air/oil separating device, which will be referred to simply as a deaerator 40 here, can be used in the return line.

The deaerator 40 can allow to achieve a relatively high degree of separation of the air from the oil relatively quickly, at suitable low weight and cost. A motivation to use a deaerator 40 can be associated with a desire to limit the footprint/volume of the oil reservoir, a typical consideration in aviation often put into balance with weight, costs, etc, as a larger oil reservoir could be required to achieve a suitable degree of air-oil separation passively in the reservoir. The deaerator 40 can be active, and be configured for harnessing centrifugal acceleration to accelerate the separation of the oil from the air which tends to arise naturally over time due to the difference in densities between the different fluids. Separation efficiency, a specification which typically refers to the degree at which the fluids are effectively separated from one another in the corresponding outlets in various operating conditions, and which can specify limits of % of oil in air or % air in oil, by volume or by weight, for instance, is typically a significant consideration in aircraft lubrication system deaerator design.

An example of a deaerator 40 is presented at FIG. 2A. The deaerator has a swirler cavity 42, a cavity shaped in a manner to favor the continuous rotation of the fluid circulating therein around an axis 41. In this case, the axis is straight and the vortex has a generally solid of revolution in shape. In practice, the cavity 42 is formed within some form of housing 44 which can be made of one or more component and which has an internal surface generally having a surface of revolution shape. In this example, the housing 44, and can be said to have a radially-outer wall 46 extending along the axis, between a proximal wall 48 and a distal wall 50. The proximal wall 48 and the distal wall 50 can both extend radially inwardly from corresponding axial ends of the radially-outer wall 46. In this example, the radially-outer wall 46 is cylindrical tubular and the proximal and distal walls 48, 50 are circular discs (except for openings forming inlet and/or outlet). The expression proximal can be used to refer to "closer to the inlet" for instance, in this specification. In one example, the swirler cavity 42 can have a generally cylindrical geometry with the radially-outer wall 46 being tubular in shape and the proximal and distal walls 48, 50 being generally disc-shaped, but it will be understood that different, potentially more elaborated or complex geometries can be preferred in alternate embodiments. The swirler cavity 42 is generally solid of revolution shaped and has smooth surfaces to facilitate preservation of fluid rotation around the axis. Maximizing rotation of the fluid in the swirler cavity 42 can be desired as its circumferential momentum can be harnessed to favor separation due to the difference in fluid density and centripetal acceleration. Indeed, the denser oil can be driven radially outwardly and concentrate to form a pool radially outwardly, while the lighter air can migrate radially inwardly.

The path followed by the mixture of air and oil can be referred to herein as the separation path 52. The separation path 52 can be said to separate in the swirler cavity 42 into an oil segment 54 leading to an oil outlet 58, and an air segment 56 leading to an air outlet 60. The air segment 56 is typically radially internal to the oil segment 54 past the splitting area. All the walls of the swirler cavity are typically surface of revolution shaped, except for any inlets and outlets, and any inlets and outlets can be configured in a manner to minimize imparting turbulence or pressure losses into the flow. For instance, in a circular disc-shaped proximal wall 48, an opening 62 can be the only irregularity in an otherwise planar surface. In this embodiment, the opening 62, acts both as an inlet to the swirler cavity 42, and as an outlet of an upstream conduit 66, and fluidly connects the upstream conduit 66 to the swirler cavity 42. Similarly, outlet openings can be provided. Outlet openings can be circular, or be provided in the form of a radially inner edge, for instance, of an annular wall portion centered on the axis. The housing 44 can be housed in another housing, not shown, within which some fluid can be recirculated along the separation path 52 depending on the particulars of the design. Moreover, depending of the design, an impeller may or may not be present within the swirler cavity. If used, the impeller can be driven to introduce circumferential momentum into the vortex, or otherwise simply used as additional partitioning or segmenting of the swirler cavity to favor the efficiency of separation of the oil from the air, and be driven into rotation by the circumferential momentum of the flow.

As presented in the example deaerator 40 presented in FIGS. 2A and 2B, it was found that introducing a swirling conduit portion 64 immediately upstream of the swirler cavity 42 could be beneficial to separation efficiency. In particular, it was found that curvature in a conduit 66 upstream of the swirler cavity 42, such as a swirling conduit portion 64 or even an elbow 68 can be beneficial to begin separating the oil from the air, with the oil migrating radially outward of the curvature radius and the air "floating" above it radially inwardly relative to the curvature radius, within the conduit. Moreover, it was found that the geometry of the conduit 66, and particularly the portion immediately upstream of the swirler cavity 42, can contribute to the strength of the vortex. Indeed, purposeful orientation of the fluid as it enters the swirler cavity 42, in a manner to cross the opening with a significant amount of tangential momentum, and in a manner to avoid generating unnecessary turbulence, can favor the strength of the vortex and thus the centrifugal acceleration within the swirler cavity and the separation efficiency. Finally, it was also found that by using a swirling conduit portion 64 which turned around the axis 41, in a somewhat helical manner as perhaps best seen by looking both to FIGS. 2A and 2B, before reaching the opening 62 and the swirler cavity 42, can further predispose an area of higher oil concentration in a manner to be positioned and directed radially outwardly nearing the outlet 62 of the inlet conduit 66, which can direct it specifically towards the radially-outer oil segment 54 of the separation path, and can simultaneously predispose an area of higher air concentration radially inwardly, which can direct air specifically towards the radially-inner air segment, and be further beneficial to separation efficiency. Further explanation and example concerning the latter will be presented below.

In the embodiment presented in FIGS. 2A and 2B, the swirling conduit portion 64 is oriented both circumferentially and axially immediately upstream of the opening 62 due to the combination of the turning around the axis 41 (as best seen in FIG. 2B) and of the pitch P of the swirling conduit portion (best seen in FIG. 2A), which takes the form of a progression in the orientation of the axis 41 along the turning length of the conduit. This circumferential and axial momentum enters the swirler cavity 42 with the fluid and contributes to sustaining the vortex. Any turbulence or restriction to fluid flow can break or slow down this momentum, but turbulences can be minimized with smooth surfaces and restrictions can be minimized by streamlining the structure as a function of the engineered vortex flow geometry.

The conduit 66 upstream of the swirler cavity 42 can have different cross-sectional profiles, depending on the embodiment, and the cross-sectional profile can be constant along a portion or the entirety of the length, or vary along a portion or the entirety of the length. FIG. 3A schematizes a possible circular cross-sectional profile in the swirling conduit portion 64 of the conduit 66. FIG. 3B schematizes a possible obround cross-sectional profile, and FIG. 3C schematizes a possible elliptic cross-sectional profile. The latter cross-section profiles can be said to be symmetrically concave parabolic. Other cross-sectional profiles are possible and the cross-sectional profile can even be intentionally modified along the length of the conduit, an example of which will be presented below.

In the swirling conduit portion 64, the cross-sectional shape of the profile can be said to have an axial dimension 70, extending in the orientation of the axis 41, and a radial dimension 72, extending radially relative to the axis 41. In the case of the obround and elliptic cross-sectional profiles, shown respectively in FIGS. 3B and 3C, the axial orientation can be greater than the radial orientation, for instance. Moreover, the cross-sectional shape of the profile can be said to have a radially inner side 74 or surface, relative to the axis 41, and a radially outer side 76 or surface, diametrically opposite the radially inner side 74. Further, the cross-sectional shape of the profile can be said to have a first side 78 proximate the swirler cavity 42, and a second side 80 diametrically opposite the first side 78, away from the swirler cavity 42. We will get back to these notions for characterizing possible shapes and configurations further below.

The shape of the opening 62 in the proximal wall 48 of the housing 44, which fluidly connects the conduit to the swirler cavity, can depend on a number of factors such as the geometry of the proximal wall 48, the cross-sectional profile of the conduit 66 along the opening, immediately upstream of the opening, and the particularities of the swirling path in the opening region, such as the turning radius (particularly relative to the dimensions of the proximal wall) and pitch for a helical swirling conduit portion for instance.

In an effort to harness circumferential momentum in the swirling conduit portion 64, the pitch P can be limited. However, a certain amount of pitch may be required to allow a suitable shape and size of the opening 62. Independently of the cross-sectional profile, the cross-sectional profile can have an axially oriented dimension 70 and a transversally oriented dimension 72. The pitch, can be defined as the amount of axial progression of the conduit 66 for a complete turn thereof around the axis (including possibly a projection of such an axial progression should the swirling continue for a full turn in cases such as the one illustrated where it does not). The pitch can be of a size comparable to the axially oriented dimension 70 of the profile, for instance. The pitch P can be between 0.5 and 1.5 of the axial dimension 70, for instance, or perhaps preferably of between 0.8 and 1.2 of the axial dimension 70. Sizes lower than the axial dimension 70 are possible when the swirling does not make a full turn, for instance.

FIG. 4, presents portions of a deaerator 140 having another possible geometry, and in which the swirling conduit portion 164 has a continuous, obround, cross-sectional profile. The turning of the conduit can continue along the circumferential length of the opening, which can give the opening 162 a shape reminiscent of a crescent or banana, with profiles and pitches such as presented above, and a generally planar, disc-shaped proximal swirler cavity wall 148. The shape of the opening can progressively increase in radial width and then progressively decrease in radial width as its center progresses circumferentially in the orientation of the swirl, and as the axial thickness of the conduit diminishes as a function of the pitch and turning.

FIG. 5 shows a computer fluid mechanics simulation of the relative concentration of oil and air which can occur at the opening 162 based on the use of a swirling conduit portion 164 upstream thereof, showing that the oil can be significantly more concentrated radially outwardly 180 relative to the axis and the air can be significantly more concentrated radially inwardly 182 relative to the axis, another color or tone being used to depict regions of intermediate concentration 184.

FIGS. 6A-6C present another embodiment of a conduit 266 having a swirling conduit portion 264 turning around an axis 241 upstream of an opening 262. In this embodiment, the conduit 266 has an obround-shaped cross-section such as illustrated in FIG. 3B, which tapers off due to the pitch along the circumferential length of the opening, i.e. from an upstream end 288, or beginning, of the opening 262, to a downstream end 289 of the opening 262. To better illustrate the tapering, additional views 6B and 6C are presented, taken from corresponding lines 6C-6C and 6B-6B of FIG. 6A, and where the intersection of a virtual cylindrical surface 299 and the inside of the conduit 266 is shown relative to the structure of the conduit 266 which is otherwise made translucent to allow seeing the intersection for the purpose of illustration and understanding. The view of FIG. 6C is taken roughly radially inwardly in alignment with the beginning 288 of the opening, showing the beginning of the circumferentially oriented tapering, whereas the view of FIG. 6B is taken roughly radially inwardly in alignment with the downstream end 289 of the opening 262, showing the termination of the circumferentially oriented tapering as the swirling conduit portion feathers into the swirler cavity. The interface between the edges of the opening and the swirling conduit portion can be rounded to a certain extent to provide a smooth transition between the two flow environments.

The turning of the conduit 166, 66, 266 can preferably extend upstream of the circumferential length 186 of the opening 162. For instance, the swirling conduit portion can extend along an angle of at least 10°, preferably at least 25°, more preferably at least 40°, more preferably at least 55°, before the circumferential position of the beginning 188 of the opening 162. It was found that in some embodiments, the advantages associated to extending the length of the swirling conduit portion 164, 64 began to fade when extending the length to above about 90°, 75°, or even 60° upstream of the opening 162, 62, at which point other considerations such as additional weight associated to additional conduit length can begin to take precedence over any advantages associated to further extending the length of the swirling conduit portion 64. This being said, in some embodiments, using an additional curve higher upstream of the conduit 66 can be useful. In the embodiment presented in FIGS. 2A and 2B, it was found useful to introduce an elbow 68 upstream of a straight portion 69 connecting the elbow portion 68 to the swirling conduit portion 64.

The radius of curvature r at which the center of the swirling conduit portion 64, 164 turns around the axis 41 can be roughly the same as the radial position R of the center of the opening relative to the axis 41. In some cases there can be some degree of axial misalignment between the radius of curvature and the axis 41. Moreover, in some cases, it can be preferred for the radial position of the center of the opening 62 to be somewhat greater than the radius of curvature of the swirling conduit portion 64 upstream of the opening 62. For instance, in some embodiments, the radial distance between a center of the opening and the axis can be of between 115% and 100% of a radius of curvature of the swirling conduit portion upstream of the opening, preferably of between 105 and 110%.

FIG. 7 presents a possible example geometry of a swirler cavity 142 for the deaerator 140 shown in FIG. 4. As shown, in this example, the housing forming the swirler cavity 142 has a rotor 190 in the form of one or more component configured to rotate around the axis 141, in the circumferential direction of the flow, relative to other components such as the swirling conduit portion 164 which can remain fixed relative to the axis 141. In this example, the rotor 190 has as impeller blades 192. The proximal wall can be formed by a combination of a static portion 148, and an annular, radially outward portion 194 of the rotor 190. The rotor 190 can have a circumferentially outwardly oriented pool area 196 where a given oil level can be sustained during operation of the deaerator, and a disc-like partition 198 can partially, radially-outwardly, penetrate into the pool 196, around the entire circumference, and at an intermediate axial location, so as to further favor separation efficiency. The air segment can penetrate radially inwardly upstream of the partition 198, into an axially oriented conduit portion 160 formed in the rotor. The rotor can be externally driven into rotation. A distal "gate" portion 199 of the rotor 190 forms the opposite axial end of the pool 196.

During standard operation, oil can be fed into the swirler cavity 142, 42 at a tangential, angular velocity of between 95% and 110% of the angular velocity or the rotating impeller 192, preferably between 100 and 105%, and the deaerator 140 can be configured specifically with this in mind. For instance, in one embodiment, the impeller 192 can be driven entirely by the momentum of the oil/air mixture and naturally reach a speed of between 95 and 100% of the speed of the oil/air mixture through the opening, or the scavenge pump and any drive motor can be configured, taking into consideration the context of fluid circulation in primary operating conditions, in a manner for such relative speeds to be sustained.

As evoked above, the cross-sectional profile of the conduit, and in particular of the swirling conduit portion 164, can evolve along its length for various reasons. In the embodiment presented in FIG. 4, it was preferred to vary the cross-sectional profile of the conduit 166 in the swirling conduit portion 164 as it reaches, and along the circumferential length of the opening, from a symmetrically concave parabolic cross-section to a progressively more and more unsymmetrically-concave parabolic cross section having gradually diffusing and enlarging exit area to minimize the axial discharge velocity of the working fluid and direct a concentration of oil more specifically towards the pool 196 and otherwise the oil segment of the separation path, so as to avoid and/or limit any remixing of oil and air in the swirler cavity.

FIG. 8 illustrates the evolution of the cross-sectional profile of the swirling conduit portion 164 in the vicinity of the opening 162. More specifically, as the swirling conduit portion 164 reaches the opening 162, the radially outer surface or side 176 begins to slope towards the radially inner surface 174 towards the second side 180.

As shown in FIG. 9, the resulting cross-sectional profile at the outlet section of the conduit which is open due to the presence of the opening 162, can have a radially inner side 174 which is generally axially oriented, and a radially outer side 176 which fans the concentration of oil radially outwardly towards the pool 196

Generally, in accordance with the above, it was found possible to shape a swirling conduit portion in a manner to increase gas-liquid mixture separation before entering the swirler cavity. The mixture can follow a longer and smoother path from the exit of the scavenge pumps towards the rotating impeller. The helical path of the swirling conduit portion can push the denser oil to the outer surface of the passage due to its higher inertia. As a result, most of the denser liquid can enter the impeller at the largest diameter of its inlet. This can help to reduce the impeller's burden on separation as it receives a flow already stratified improving separation efficiency while minimizing heat generation.

Moreover, the cross section of the swirling conduit portion can be sized sized so that the mixture enters the rotational impeller domain with a similar circumferential velocity. This can reduces the amount of energy necessary to drive the impeller to separate the oil as the impeller does not have to increase the circumferential speed of the denser liquid.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, although referred to herein as a deaerator for simplicity, it will be understood that the deaerator is a separator which can be used to separate other fluids than air from oil in different applications. Moreover, in the embodiments presented above, it will be noted that the swirling conduit portion does not penetrate into the swirler cavity, and rather connects and terminates with the proximal wall, this can be preferred in some embodiments to avoid a re-entrant edge affecting the swirling momentum of the flow within the cavity. Yet further modifications could be implemented by a person of ordinary skill in the art in view of the present disclosure, which modifications would be within the scope of the present technology.

The invention claimed is:

1. A deaerator for an aircraft engine lubrication system, the deaerator comprising:
    a swirler cavity extending circumferentially around an axis and axially between a proximal wall and a distal wall,
    a separation path dividing the swirler cavity into a radially outer oil segment leading to an oil outlet and a radially inner air segment leading to an air outlet, and
    a swirling conduit portion having a length turning around the axis upstream of an opening in the proximal wall along the separation path, the opening fluidly connecting the swirling conduit portion to the swirler cavity, the swirling conduit portion disposed both circumferentially and axially immediately upstream of the opening;
    wherein at least a portion of the swirler cavity is provided in the form of a rotor including radially and axially oriented impeller blades, the swirling conduit portion forming part of a stator.

2. The deaerator of claim 1 wherein the opening is crescent-shaped having a curvilinear length oriented circumferentially relative to the axis.

3. The deaerator of claim 2 wherein the opening spans along an angle of at least 45° around the axis.

4. The deaerator of claim 1 wherein the swirling conduit portion turns around the axis along an angle of at least 40°.

5. The deaerator of claim 1 wherein the swirling conduit portion turns around the axis along an angle of at least 55°, upstream of the opening.

6. The deaerator of claim 1 wherein the swirling conduit portion has a cross-sectional shape having an axial dimension and a radial dimension, the axial dimension being constant along more than half the length of the swirling conduit portion, and a pitch of between 0.5 and 1.5 of the axial dimension.

7. The deaerator of claim 6 wherein the pitch is of between 0.8 and 1.2 of the axial dimension.

8. The deaerator of claim 1 wherein a radial distance between a radial center of the opening and the axis is of between 115% and 100% of a radius of curvature of the swirling conduit portion upstream of the opening.

9. The deaerator of claim 8 wherein the radial distance is of between 105 and 110% of the radius of curvature.

10. The deaerator of claim 1 wherein the swirling conduit portion is helical in shape.

11. The deaerator of claim 1 wherein the swirling conduit portion has a radially outer surface and a radially inner surface, the radially outer surface sloping towards the radially inner surface and towards a side adjacent the opening.

12. The deaerator of claim 11 wherein the sloping increases along the length of the swirling conduit portion towards the opening and is configured to fan a flow of concentrated oil radially outwardly towards the radially outer oil segment of the separation path.

13. The deaerator of claim 1 configured for a tangential, angular velocity of fluid exiting the opening to be of between 95% and 110% of an angular velocity of rotation of the impeller blades.

14. The deaerator of claim 1 wherein the separation path extends across an elbow conduit portion upstream of the swirling conduit portion.

15. The deaerator of claim 14 wherein the separation path extends across a straight conduit portion between the elbow conduit portion and the swirling conduit portion.

16. A fluid separator for separating a higher density liquid from a lower density fluid, the separator comprising:
  a separation path extending sequentially across a swirling conduit portion and a swirler cavity,
  the swirler cavity having an axis and defined within a radially-outer wall, a proximal wall and a distal wall, the proximal wall and the distal wall extending radially inwardly at axially opposite ends of the radially-outer wall,
  the separation path dividing within the swirler cavity into a radially outer oil segment leading to an oil outlet and a radially inner air segment leading to an air outlet,
  the swirling conduit portion turning around the axis upstream of an opening in the proximal wall, the opening fluidly connecting the swirling conduit portion to the swirler cavity, the swirling conduit portion oriented both circumferentially and axially immediately upstream of the opening;
  wherein at least a portion of the swirler cavity is provided in the form of a rotor including radially and axially oriented impeller blades, the swirling conduit portion forming part of a stator.

17. A method of separating air from oil in an aircraft engine lubrication system by using the deaerator recited in claim 1, the method comprising:
  performing a first separation step including conveying a mixture of said air and oil along a swirling conduit portion including turning a flow of the mixture along an axis while simultaneously advancing the flow of the mixture along the axis, said turning causing the oil to concentrate radially outwardly and said air to migrate radially inwardly;
  outputting the mixture of air and oil from the swirling conduit portion both circumferentially and axially into a swirler cavity, and performing a second separation step including rotating the mixture of air and oil within the swirler cavity, including directing a radially outward concentration of oil to an oil outlet and a radially inward concentration of air to an air outlet.

18. The method of claim 17 wherein said performing the second separation step includes rotating an impeller within the swirler cavity.

19. The method of claim 17 wherein said outputting the mixture includes outputting the mixture at a circumferential velocity of between 95% and 110% of an angular velocity of the rotating impeller.

* * * * *